United States Patent [19]

Kim et al.

[11] Patent Number: 5,138,242
[45] Date of Patent: Aug. 11, 1992

[54] INVERSE ELECTROMOTIVE FORCE ELIMINATING DEVICE FOR MOTOR UTILIZING MOS-FET

[75] Inventors: Dong-Il Kim, Seoul; Sang-Kwon Im, Suwon; Hyo-Kyu Kim, Suwon, all of Rep. of Korea

[73] Assignee: Samsung Electronics Co., Ltd., Kyonggi-Do, Rep. of Korea

[21] Appl. No.: 749,106

[22] Filed: Aug. 23, 1991

[30] Foreign Application Priority Data

Aug. 24, 1990 [KR] Rep. of Korea ............ 90-13160

[51] Int. Cl.$^5$ .................................................. H02P 3/06
[52] U.S. Cl. ........................................ 318/501; 318/368; 318/459
[58] Field of Search ............... 318/138, 254, 362, 373, 318/375, 379, 380, 439, 459, 368, 500, 501; 388/853, 856, 928.1

[56] References Cited

U.S. PATENT DOCUMENTS

| | | | |
|---|---|---|---|
| 3,671,837 | 6/1972 | Kanno | 388/843 |
| 3,795,850 | 3/1974 | Grygera | 388/821 |
| 3,839,661 | 10/1974 | Wada | 318/138 |
| 4,278,921 | 7/1981 | Medding et al. | 318/254 |
| 4,426,606 | 1/1984 | Suita et al. | 318/375 |

*Primary Examiner*—Bentsu Ro
*Attorney, Agent, or Firm*—Burns, Doane, Swecker & Mathis

[57] ABSTRACT

This invention relates to an inverse electromotive force eliminating device which protects a motor controller of a motor utilizing a MOS-FET by effectively eliminating the inverse electromotive force generated in a process for accelerating and decelerating a mobile device by utilizing an alternating current servo motor operated by applying the power supply of an inverter. A voltage, generated by an inverse electromotive force upon accelerating and decelerating of a motor in a state when the direct current required for circuit operation is supplied by power supply, increases at an input of an inverter. The voltage is detected by an inverse electromotive force detector and thereafter it is applied to an inverse electromotive force eliminator by utilizing a MOS-FET base driver so that the inverse electromotive force of motor is eliminated. Simultaneously, first and second indicators indicate whether the power supply is inputted and whether the inverse electromotive force is generated.

8 Claims, 3 Drawing Sheets

INVERSE ELECTROMOTIVE FORCE ELIMINATING DEVICE FOR MOTOR UTILIZING MOS-FET

FIELD OF THE INVENTION

The present invention relates to a device for eliminating an inverse electromotive force for a motor. More particularly, a device utilizing a MOS-FET (Metal oxide semiconductor-field effect transistor), prevents damage of a switching element constituting an inverter and protects a motor controller effectively eliminating an inverse electromotive force of a motor generated when high speed acceleration and deceleration of a mobile device occurs by utilizing an alternating servo motor driven by a power supply of an inverter.

BACKGROUND OF THE INVENTION

A conventional inverse electromotive force eliminating device for a motor utilizes a transistor element for eliminating an inverse electromotive force. With the conventional system a first transistor is required for driving the transistor element. Consequently, the circuit becomes complicated. Several problems arise due to the increase complexity. For example, significant time and a considerable amount of money are necessary to repair damage to the circuit.

A conventional example, shown in FIG. 1, corresponds to a motor control device for a magnetic disc system disclosed in Japanese Laid Open Patent Publication No. Hei-2-290174. The device includes a spindle motor 11 for rotating a recording medium, motor driving means 12 for driving said spindle motor 11, detecting means 13 for detecting an error in the power supply fed to said motor driving means 12 by power supply means 14, switch means 15 for short-circuiting between phases for driving said spindle motor 11 or between said coil and ground in an ON state, and switch control means 16 for setting said switch means to an ON state when a power supply error is detected by said detecting means 13, so that current generated at spindle motor 11 by an inverse electromotive force is eliminated. However, concerns have developed that an error in operation results because current generated by the inverse electromotive force generated at the spindle motor during a power supply error is eliminated. In particular, a problem has arisen where the motor suddenly stops rotating.

OBJECTS AND SUMMARY OF THE INVENTION

The present invention attempts to resolve the aforementioned problems. It is an object of the present invention to provide an inverse electromotive force eliminating device for a motor utilizing a MOS-FET for effectively eliminating an inverse electromotive force of the motor whereby damage to a switching element including an inverter is prevented and a controller of the motor is protected.

Another object of the present invention is to provide an inverse electromotive force eliminating device for a motor utilizing a MOS-FET, where an inverse electromotive force generated upon accelerating and decelerating of motor is eliminated so that the size and number of parts are reduced, and high speed switching is possible, thereby simplifying the circuit.

Still another object of the present invention is to provide an inverse electromotive force eliminating device for a motor utilizing a MOS-FET to ensure high reliability whereby cost is decreased and repairing and replacing of elements are easy when the device is inoperative.

In order to accomplish the above-described objects, the inverse electromotive force eliminating device for a motor utilizing a MOS-FET according to the present invention comprises a power supply means for supplying a direct current power supply required for circuit operation, an inverse electromotive force detecting means for detecting a voltage rise at an input terminal of an inverter generated by an inverse electromotive force upon accelerating and decelerating of the motor, a MOS-FET base driver for inputting the output of said inverse electromotive force detecting means to an inverse electromotive force eliminating means by a switching means and an inverse electromotive force eliminating means in which current flows between the power supply input terminals, according to ON or OFF control of the MOS-FET to consume heat energy. A first indicating means indicates whether the power supply is inputted, and a second indicating means indicates whether the inverse electromotive force is generated.

BRIEF DESCRIPTION OF THE DRAWINGS

The specific features of the invention will be better understood from a consideration of the following detailed description of a preferred embodiment of the invention, taken with the accompanying drawings, wherein both the description and drawings are only exemplary and are not given as a restrictive example.

DETAILED DESCRIPTION OF THE PREFERRED EMBODIMENT

Hereinafter, a preferred embodiment of the present invention will be described in detail with reference to the accompanying drawings.

Figure 1:
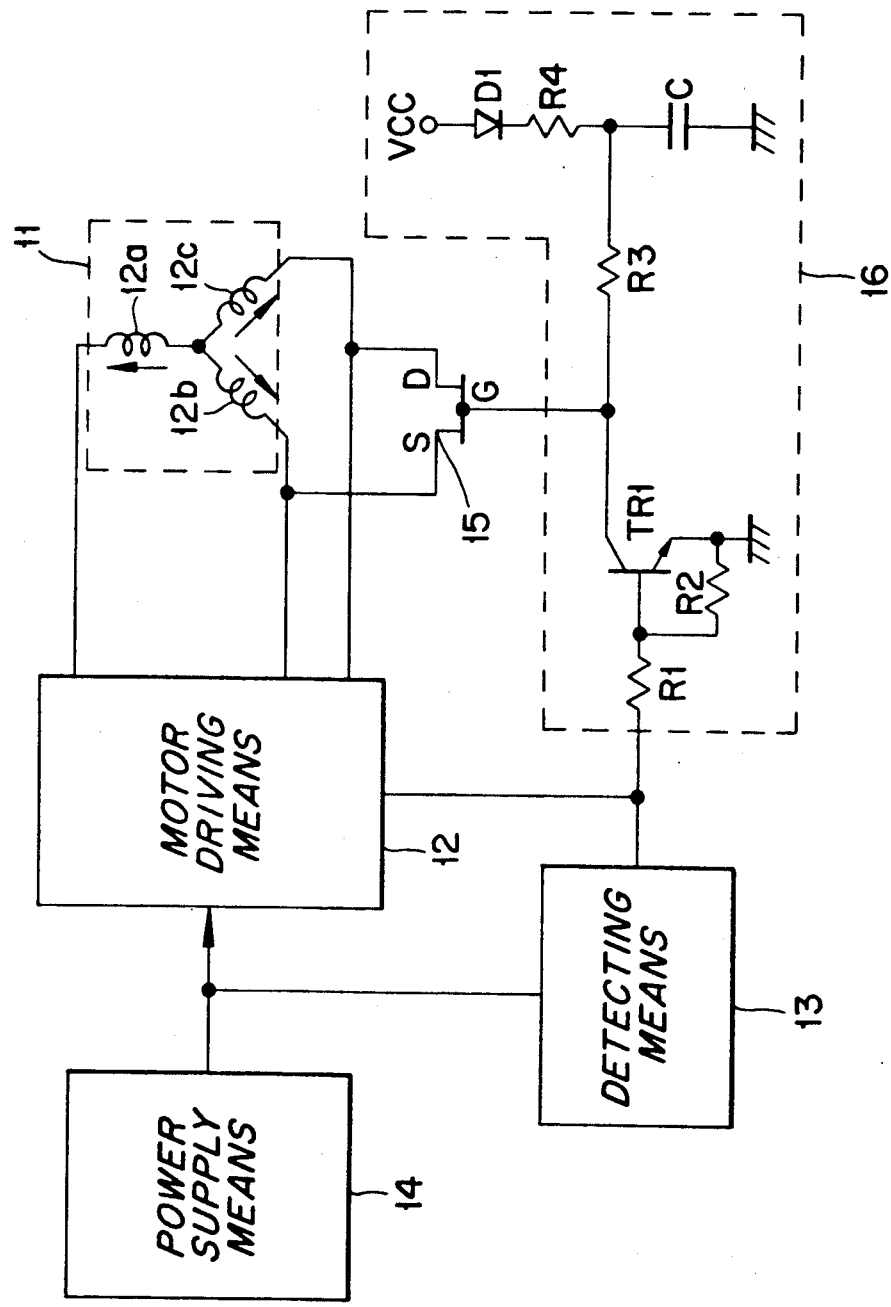
FIG. 1 is a circuit diagram of a configuration for a conventional system.
Figure 2:
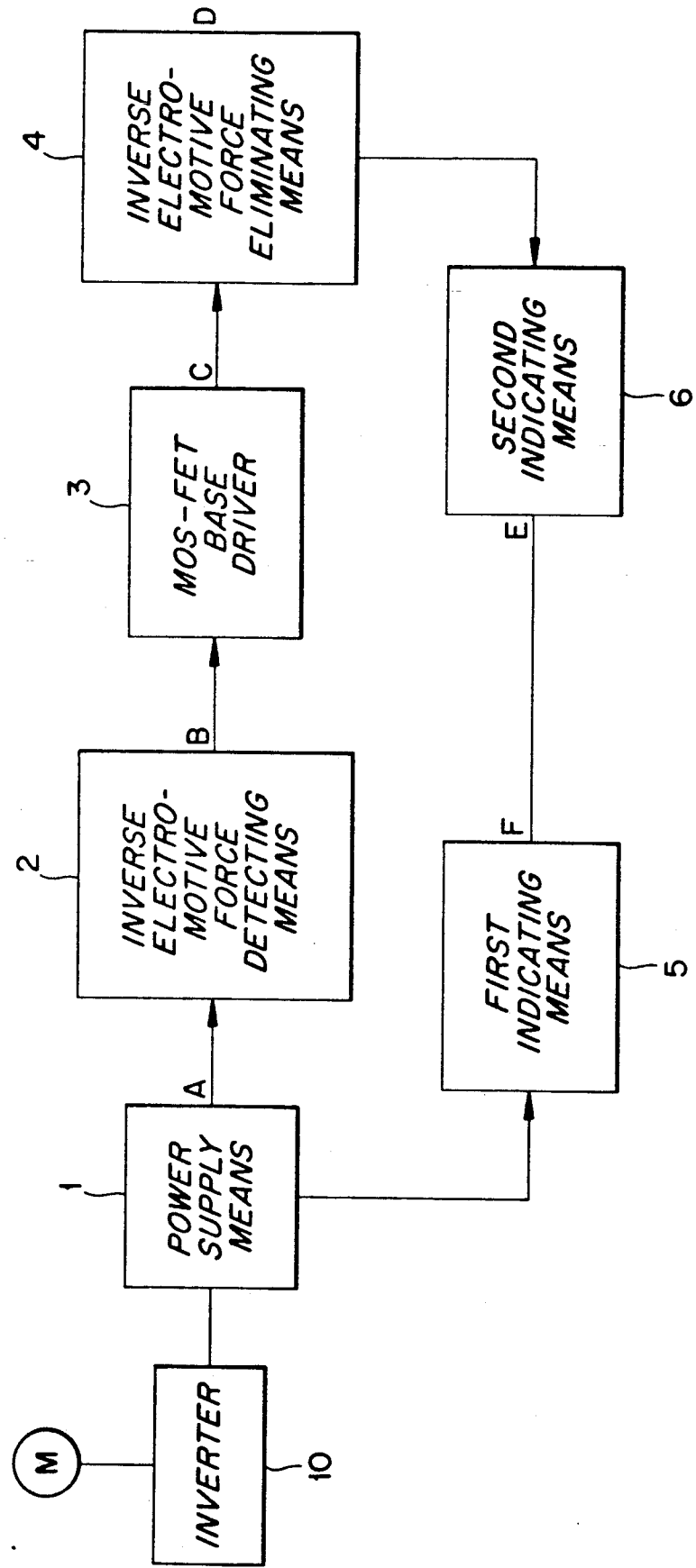
FIG. 2 is a circuit diagram showing a control system of a inverse electromotive force eliminating device of a motor utilizing a MOS-FET according to the present invention.
Figure 3:
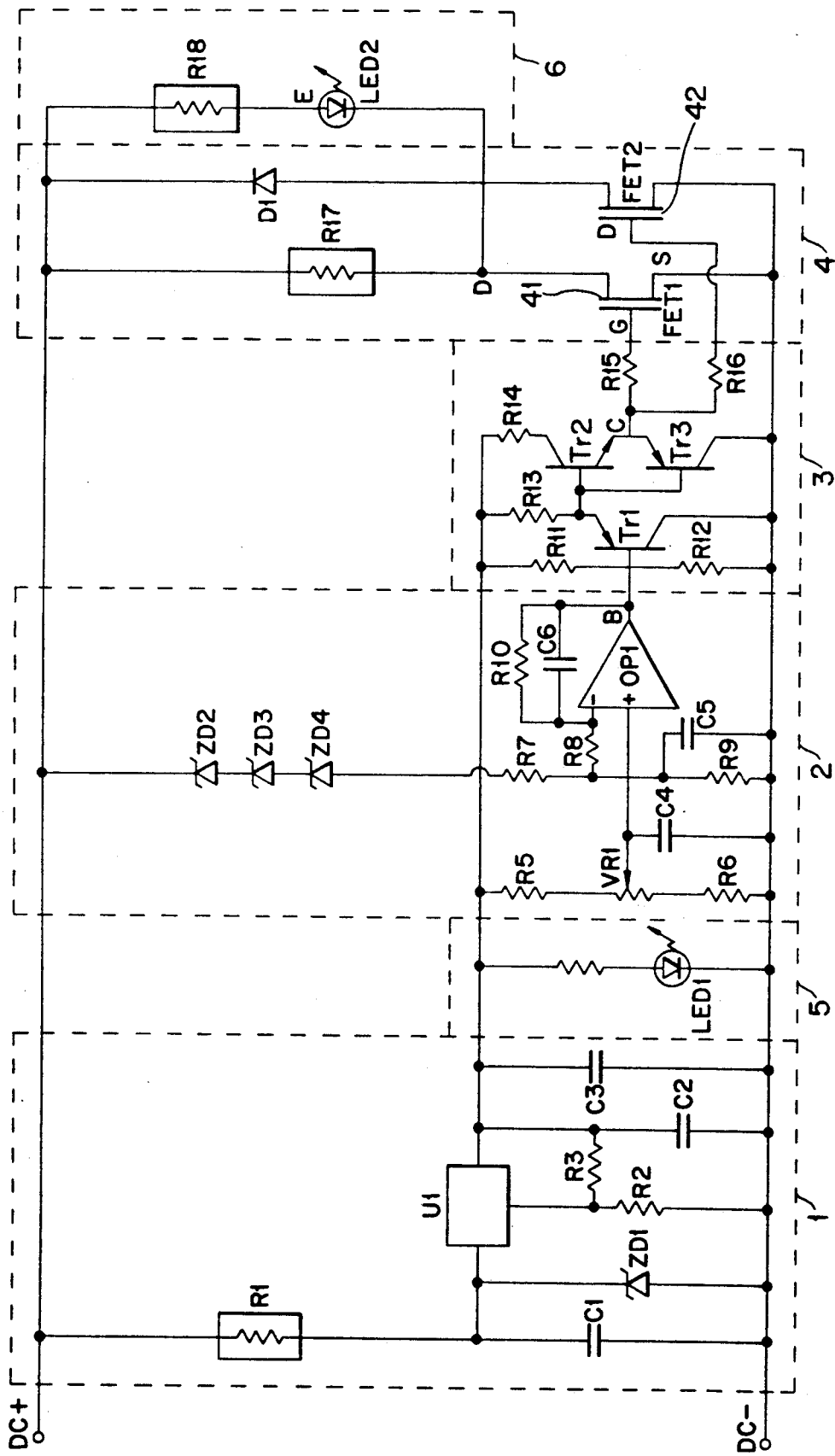
FIG. 3 is a detailed circuit diagram of FIG. 2.

FIG. 2 is a circuit diagram showing a control system of an inverse electromotive force eliminating device and FIG. 3 is a detailed circuit diagram of FIG. 2. With reference to FIGS. 2 and 3, power supply means 1 includes resistors R1, R2 and R3, capacitors C1 and C2, Zener diode ZD1 and high voltage positive adjustable regulator U1 for applying power to the inverse electromotive force eliminating device by utilizing DC 140 V and DC 300 V used for inverter 10. Inverse electromotive force detecting means 2 includes resistors R5, R6, R7, R8, R9, R10 and VR1, capacitors C4, C5 and C6, Zener diodes ZD1, ZD2 and ZD3, and an operational amplifier OP1 for operating as a comparator to detect the increase in voltage between DC positive (+) and DC negative (−) which is input to inverter 10. MOS-FET base driver 3 sends the output of said inverse electromotive force detecting means 2 to inverse electromotive force eliminating means 4. The MOS-FET base driver 3 includes transistors Tr1, Tr2 and Tr3 which function as switching means, and resistors R11, R12, R13, R14, R15 and R16. Inverse electromotive force eliminating means 4, including resistors R17, diode D1 and MOS-FETs 41 and 42, suppresses excess voltage in accordance with a signal inputted from said MOS-FET base driver 3. The inverse electromotive force eliminating means 4 utilizes the principle that a voltage drop is produced between DC (+) and DC (−) when excessive current flows. First indicating means 5 includes resistor R4 and light emitting diode LED1 and indicates whether the power supply is applied. Second indicating means includes resistor R18 and light emitting diode LED2 and indicates whether the inverse electromotive force is generated.

The inverse electromotive force eliminating device is designed to easily control, by dividing into two, the case used by full-wave rectifying the voltage of an AC 110 V and AC 3φ 220 V system.

The power supply means 1 utilizes power sources of DC 140 V and DC 300 V supplied to the inverter 10.

The power supply current, according to a voltage of 47 V applied from said power supply means 1 is determined by resistor R1 and flows in the circuit. The alternating current component contained within the input voltage applied between DC (+) and DC (−) is eliminated by a low band filter including capacitor C1.

When a power supply is inputted to the power supply input terminals between said DC (+) and DC (−), the light emitting diode LED1 emits light through the resistor R4 thereby indicating that the power supply is inputted. The capacitor C3 is connected in parallel to the output side of power supply means 1 so that the power supply terminals can be stably operated.

On the other hand, the output voltage of high voltage positive adjustable regulator U1 is determined by the input voltage determined by Zener diode ZD1 and resistors R2 and R3. It is designed to generate the power supply for the circuit by utilizing the voltages of DC 140 V and DC 300 V supplied to the inverter 10.

The voltage applied between DC (+) and DC (−) of inverter 10 by an inverse electromotive force generated upon accelerating and decelerating of motor M rises. When AC 100 V is inputted to detect the rising amount of said voltage, the DC voltage is $$Vdc = 2 \; Vrms \; (v)$$

wherein,

Vdc: direct current voltage

Vrms: alternating current voltage effective value accordingly, it becomes approximately 141 (V). Therefore, the inverse electromotive force at this moment is detected when it is more than 200 (V). When AC 3φ 220 (V) is inputted, the DC voltage becomes approximately 300 (V), therefore, the inverse electromotive force at this moment is detected when it is more than 400 (V).

Explaining said inverse electromotive force detecting operation, it is as follows.

In a state three Zener diodes ZD2, ZD3 and ZD4 are mutually connected in series. When a backward voltage of a PN junction diode is increased then a small increase in current is realized, but when the backward voltage is increased more than a certain voltage (Zener voltage) then the backward current suddenly increases substantially. When a backward current flows due to generating said inverse electromotive force, a voltage produced by a resistor R7 and a resistor R9 is applied to an inversion terminal (−) of operational amplifier OP1.

The voltage inputted to said inversion input terminal (−) is divided by resistor R5, resistor R6 and variable resistor VR1 of operational amplifier OP1 whereby it is compared with the reference voltage established at non-inversion input terminal (+). As a result of said comparison, when the voltage inputted to the inversion input terminal (−) is high relative to the reference voltage established at the non-inversion input terminal (+), that is, when an inverse electromotive force to be eliminated is inputted, a high level signal [e.g., 5 (v)] is outputted at the output terminals of the operational amplifier OP1, and the output of transistor Tr1 becomes 10 (V), and transistor Tr2 is operated whereby a drain D and a source S of MOS-FET 41 enter a short-circuited state.

When the drain D and source S of said MOS-FET 41 are short-circuited, the backward current flows to resistor R17 connected to the MOS-FET 41 and the current is consumed as heat energy whereby excess voltage is suppressed. Simultaneously, MOS-FET 42 is operated through a resistor R16 connected to a node point that an emitter of transistor Tr2 and an emitter of transistor Tr3 are connected, and diode D1 is conductive and light emitting diode LED2 is light-emitted through a resistor R18 to indicate that an inverse electromotive force generated is to be eliminated.

On the other hand, when the voltage of non-inversion terminal (+) is larger than the voltage of inversion terminal (−), the operational amplifier OP1 outputs a low level signal of 0 (V), and at this moment, the transistor Tr1 becomes ON (because Tr1 is PNP) whereby 0 (V) is outputted, while the transistor Tr2 becomes OFF and the transistor Tr3 becomes ON, and gate G of MOS-FET 41 becomes a state of 0 (V) so that the light emitting diode LED2 is not emitting light.

The MOS-FET is a FET (Field Effect Transistor) which is combined with a metal oxide semiconductor at a gate portion. A metal gate electrode of aluminum or the like is made by inserting a very thin insulation film between the channel thereof, and since the gate is insulated from the channel, leakage current is extremely small, but the input resistance becomes very high, and it can be controlled even with a forward voltage, and it can be driven by using an IGBT (Insulated Gate Board Transistor) instead of a MOS-FET in the circuit.

Thus, the inverse electromotive force eliminating device for a motor utilizing the MOS-FET of the present invention employs a MOS-FET, instead of a transistor, to eliminate the inverse electromotive force generated when accelerating and decelerating a motor. Therefore, the size and number of parts necessary for the device are reduced and high speed switching can be realized.

While a particular embodiment of the present invention has been described and illustrated, it should be understood that the invention is not limited thereto since modifications may be made by person skilled in the art. The present application contemplates any and all modifications that fall within the spirit and scope of the underlying invention disclosed and claimed herein.

We claim:

1. A device for eliminating an inverse electromotive force in a motor, comprising:

power supply means for supplying power to said device;

detecting means for detecting an increase in voltage associated with an inverse electromotive force generated upon accelerating and decelerating the motor;

inverse electromotive force eliminating means for consuming current corresponding to the voltage increase associated with the inverse electromotive force;

a base driver responsive to said detecting means for driving said inverse electromotive force eliminating means;

first indicating means responsive to said power supply means for indicating whether power is being supplied by said power supply means; and second indicating means responsive to said inverse electromotive force eliminating means for indicating whether the inverse electromotive force is being generated.

2. A device according to claim 1 includes a voltage source, said voltage source at least supplies voltages of 140 and 300 volts.

3. A device according to claim 1 wherein said detecting means includes a comparator for determining whether there is a substantial increase in voltage associated with said inverse electromotive force.

4. A device according to claim 3 wherein said comparator includes an operational amplifier.

5. A device according to claim 4 wherein said detecting means detects the inverse electromotive force when said inverse electromotive force is greater than 200 volts and said power supply means supplies a power of AC 100 (V) or when said inverse electromotive force is greater than 400 volts and said power supply means supplies a power of 3φ 220 (V).

6. A device according to claim 1 wherein said first indicating means includes at least a light emitting diode to indicate whether the power supply means is inputting power to said device.

7. A device according to claim 1 wherein said second indicating means includes a light emitting diode to indicate whether said motor is generating said inverse electromotive force.

8. A device according to claim 1 wherein said detecting means detects the inverse electromotive force when said inverse electromotive force is greater than 200 volts and said power supply means supplies a power of AC 100 (V) or when said inverse electromotive force is greater than 400 volts and said power supply means supplies a power of 3φ 220 (V).

* * * * *